Patented Oct. 20, 1953

2,656,282

UNITED STATES PATENT OFFICE 2,656,282

METHOD FOR THE PRODUCTION OF IRON OXIDE FROM FERROUS SOLUTIONS

Charles Curtis Clarke, Grove City, Pa., assignor to Wheatland Tube Company, Wheatland, Pa., a corporation of Pennsylvania No Drawing. Application January 26, 1951, Serial No. 208,080

2 Claims. (Cl. 106—304)

This invention relates to a method for the production of iron oxide from liquors having a ferrous content, such as spent pickling acid, spent in the pickling of iron or steel. Almost any ferrous solution will serve as the initial material.

The term "iron oxide," as employed herein, is intended to comprise a combination of ferric oxide $Fe_2O_3$, magnetite $Fe_3O_4$, and limonite.

The iron oxide produced in accordance with this invention may be produced in various colors, as yellows, reds, browns and blacks, and having various undertones.

The products will be found especially adaptable for use as pigments.

Broadly speaking, in accordance with the method of this invention, a liquor, having a ferrous content, will be cleaned by adjustment of the pH to effect the formation of crud which is separated from the clean liquor. The crud may be calcined for the production of an impure iron oxide.

The clean liquor, after separation of the crud, will be heated, the pH adjusted, the temperature raised and an oxidizing gas introduced to effect conversion of the ferrous content to iron oxide which will precipitate. The iron oxide is finally washed to remove soluble salts, filtered and dried.

More specifically, the spent liquor will be treated for the formation of the crud by heating in a sealed autoclave to a temperature between about 50° F.–200° F., and adding an alkali such, for example, as a carbonate, bicarbonate, lime or other alkali in sufficient quantity to effect the formation of the crud. The formation of the crud will be determined visually, but generally forms within the range of about pH 2.0–pH 6.0. When the crud has formed, it is separated from the clean liquor. The clean liquor is transferred into an autoclave and heated to a temperature of about 50°–200° F., depending upon the color desired for the iron oxide product. A carbonate, bicarbonate, a mixture thereof, or a mixture of either a carbonate or a bicarbonate, or a mixture thereof, with an alkali is then added to the autoclave in quantity to adjust the pH to within about the range pH 7.0–pH 12.0.

As has been indicated, the color of the iron oxide product of the method of this invention are yellows, reds, browns and blacks. These various colors and the shades thereof are produced by a combination of the precipitation temperature and the pH of the ferrous slurry. At the lower precipitation temperatures and in the lower pH range, the colors will be in the yellow range, while in the higher precipitation temperatures and in the higher pH range, the colors will be in the black range. Reds and browns are produced at intermediate precipitation temperatures and in intermediate pH ranges.

When the required pH range is obtained, the temperature is raised to within about the range 150°–250° F.

When the required temperature is reached, an oxidizing gas, as, for example, air, oxygen or the like, is introduced at a rate within about the range 50–500 cubic feet per minute. The faster the rate at which the oxidizing gas is introduced the finer will be the particles of the iron oxide product.

The internal pressure in the autoclave during the oxidation period will be within the range 0–70 pounds per square inch gauge. Here it will be noted that the pressure during oxidation will determine the undertone of the color of the iron oxide product.

When the oxidation has been carried on for a reasonable length of time, the contents of the autoclave will be checked by the acid test to determine whether the conversion of the ferrous slurry to iron oxide is complete. When the conversion is complete, the oxidizing gas will be shut off, the iron oxide pumped to a washing tank, washed until the soluble salt content is reduced to within allowable limits, say, one-half of one per cent. The washed iron oxide is then filtered and the filter cake dried, say, to less than one per cent. free moisture. The dried iron oxide is then ready for use.

The following examples will be more specifically illustrative of the carrying out of the method in accordance with this invention:

EXAMPLE 1

*Production of medium red pure iron oxide with blue brown undertone*

A clean ferrous solution is pumped into a glass lined autoclave in the amount of approximately 1500 gallons. The autoclave is then sealed and the ferrous solution is heated to 150° F. At this point, a soda ash solution at 145° F. is pumped into the agitated ferrous solution. This pumping is continued until a pH of 8.9 is reached. Agitation is continued while the temperature of the ferrous carbonate slurry is raised to 200° F. Agitation is continued while air at 100 cubic feet per minute is diffused through the ferrous carbonate slurry and a positive internal pressure of 20 pounds per square inch is maintained. After six hours of oxidation, the slurry is checked by the acid test to determine whether the conversion of the carbonate slurry to iron oxide is complete. If not complete, oxidation is continued until completed. When the oxidation is complete, the air is shut off and the iron oxide is pumped to a washing tank. It is then washed until the soluble salt content is less than ½ of 1%. The washed iron oxide is then filtered and the filter cake is dried to less than 1% free moisture. The dried iron oxide is then bagged.

EXAMPLE 2

*Production of dark brown oxide with red black undertone*

A clean ferrous solution is pumped into a glass lined autoclave in the amount of approximately 1500 gallons. The autoclave is then sealed and ferrous solution is heated to 180° F. At this point, a soda ash solution at 145° F. is pumped into the agitated ferrous solution. This pumping is continued until a pH of 9.6 is reached. Agitation continues while the temperature of the ferrous carbonate slurry is raised to 200° F. Agitation is continued while air at 150 cubic feet per minute is diffused through the slurry and a positive internal pressure of 30 pounds per square inch is maintained. After four hours of oxidation, the ferrous carbonate slurry is checked by the acid test to determine whether the conversion of the carbonate slurry to iron oxide is complete. If not complete, oxidation is continued until completed. When the oxidation is complete, the air is shut off and the iron oxide is pumped to a washing tank. It is then washed until the soluble salt content is less than ½ of 1%. The washed iron oxide is then filtered and the filter cake is dried to less than 1% free moisture. The dried iron oxide is then bagged.

EXAMPLE 3

*Production of black iron oxide with red undertone*

A clean ferrous solution is pumped into a glass lined autoclave in the amount of approximately 1500 gallons. The autoclave is then sealed and the ferrous solution heated to 170° F. At this point, a solution consisting of a ratio of 3 parts caustic soda and 7 parts soda ash, at 145° F., is pumped into the agitated ferrous solution. This pumping is continued until a pH of 9.0 is reached. Agitation continues while the temperature of the ferrous slurry is raised to 200° F. Agitation continues while air at 150 C. F. M. is diffused through the ferrous slurry and a positive internal pressure of 30 p. s. i. g. is maintained. After 3 hours of oxidation the slurry is checked by the acid test to determine whether the conversion of the ferrous slurry to iron oxide is complete. If not complete, oxidation is continued until complete. When oxidation is complete, the air is shut off and the iron oxide is pumped to a washing tank. It is then washed until the soluble salt content is less than ½ of 1%. The washed iron oxide is then filtered and the filter cake dried to less than 1% free moisture. The dried iron oxide is then bagged.

EXAMPLE 4

*Production of yellow iron oxide with tan undertone*

A clean ferrous solution is pumped into a glass lined autoclave in the amount of approximately 1500 gallons. The autoclave is then sealed and the ferrous solution is heated to 120° F. At this point, a soda ash or bicarbonate solution at 145° F. is pumped into the agitated ferrous solution. This pumping is continued until a pH of 7.4 is reached. Agitation continues while the temperature of the ferrous slurry is raised to 200° F. Agitation continues while air at 75 C. F. M. is diffused through the slurry and a positive pressure of 0 p. s. i. g. is maintained during this oxidation. After 8 hours of oxidation the slurry is checked by the acid test to determine whether the conversion of the ferrous slurry to iron oxide is complete. If not complete, oxidation is continued until complete. When oxidation is complete, the air is shut off and the iron oxide pumped to a washing tank. It is then washed until the soluble salt content is less than ½ of 1%. The washed iron oxide is then filtered and the filter cake dried to less than 1% free moisture. The dried iron oxide is then bagged.

What is claimed is:

1. The method of producing a dark brown iron oxide with red-black undertone from an impure liquor having a ferrous content which comprises adjusting the pH of the impure liquor to within the range pH 2–pH 6 until a crud is formed, separating the crud, adjusting the pH of the residual liquor to about 9.6, elevating the temperature of the liquor to about 200° F., introducing an oxidizing gas into the liquor while maintaining pressure on the liquor of about 30 pounds per square inch until conversion of the ferrous content of the liquor to higher iron oxides is completed, washing the iron oxides and drying.

2. The method of producing a dark brown iron oxide with red-black undertone from an impure liquor having a ferrous content which comprises adjusting the pH of the impure liquor to within the range pH 2–pH 6 until a crud is formed, separating the crud, adjusting the pH of the residual liquor to about 9.6 while maintaining the liquor at a temperature of about 180° F., thereafter introducing an oxidizing gas into the liquor while maintaining the liquor at a temperature of about 200° F. and maintaining a pressure on the liquor of about 30 pounds per sq. inch until the conversion of the ferrous content of the liquor to higher iron oxides is completed, washing the iron oxides, and drying the iron oxides.

CHARLES CURTIS CLARKE.

References Cited in the file of this patent

UNITED STATES PATENTS

| Number | Name | Date |
|---|---|---|
| 1,269,442 | Hoffman | June 11, 1918 |
| 1,824,936 | Travers | Sept. 29, 1931 |
| 1,888,464 | Lofland | Nov. 22, 1932 |
| 2,133,267 | Ayers | Oct. 18, 1938 |
| 2,289,258 | French | July 7, 1942 |
| 2,357,096 | Fireman | Aug. 19, 1944 |
| 2,388,659 | Ryan et al. | Nov. 6, 1945 |
| 2,529,874 | Hoak | Nov. 14, 1950 |

FOREIGN PATENTS

| Number | Country | Date |
|---|---|---|
| 423 of 1903 | Great Britain | Dec. 10, 1903 |

PO-1050
(5/69)

UNITED STATES PATENT OFFICE
CERTIFICATE OF CORRECTION

Patent No. 3,656,282          Dated April 18, 1972

Inventor(s) Glen E. Rauth

It is certified that error appears in the above-identified patent and that said Letters Patent are hereby corrected as shown below:

Col. 1, line 63, delete "fruit" (first occurrence).
Col. 5, line 63, delete "as set forth in the appended claims"; line 68, change "and" to --an--.
Col. 6, line 69, change "or" to --of--.

Signed and sealed this 19th day of September 1972.

(SEAL)
Attest:

EDWARD M. FLETCHER, JR.          ROBERT GOTTSCHALK
Attesting Officer          Commissioner of Patents